United States Patent [19]

Lodetti et al.

[11] Patent Number: 4,709,130
[45] Date of Patent: Nov. 24, 1987

[54] APPARATUS FOR SEVERING A STRIP-LIKE OR WIRE-LIKE ELECTRODE OF A SPARK EROSION MACHINE

[75] Inventors: Attilio Lodetti, Losone; Karl Tobler, Maggia, both of Switzerland

[73] Assignee: AG fur industrielle Elektronik AGIE, Losone, Switzerland

[21] Appl. No.: 843,360

[22] Filed: Mar. 21, 1986

[30] Foreign Application Priority Data

Apr. 1, 1985 [DE] Fed. Rep. of Germany ....... 3511930

[51] Int. Cl.⁴ .......................... B23H 7/02; B21F 11/00
[52] U.S. Cl. .................................. 219/69 W; 83/355; 140/139
[58] Field of Search .......... 219/69 W, 388 S; 83/155.1, 352, 355, 926 B; 140/139; 204/206, 224 M

[56] References Cited

U.S. PATENT DOCUMENTS

| | | | |
|---|---|---|---|
| 2,261,968 | 11/1941 | Matthews | 83/355 |
| 2,356,179 | 8/1944 | Proudman et al. | 83/926 B |
| 3,483,780 | 12/1969 | Hudson | 83/155.1 |
| 3,626,797 | 12/1971 | Calvert | 83/355 |
| 3,822,374 | 7/1974 | Ullmann et al. | 219/69 W |
| 4,242,558 | 12/1980 | Kunze | 219/69 W |
| 4,383,161 | 5/1983 | Corcelle | 219/69 W |
| 4,417,118 | 11/1983 | Miyano | 219/69 W |
| 4,432,746 | 2/1984 | DeHaan | 83/155.1 |
| 4,448,655 | 5/1984 | Inoue | 219/69 W |

FOREIGN PATENT DOCUMENTS

| | | | |
|---|---|---|---|
| 56-89441 | 7/1981 | Japan | 219/69 W |
| 109226 | 6/1983 | Japan | 219/69 W |
| 232730 | 12/1984 | Japan | 219/69 W |

Primary Examiner—Philip H. Leung
Assistant Examiner—Geoffrey S. Evans
Attorney, Agent, or Firm—Neuman, Williams, Anderson & Olson

[57] ABSTRACT

An apparatus for severing a strip-like or wire-like electrode of a spark erosion machine has a belt conveyor formed by two belts positioned face-to-face and having formed in the belts corresponding cutting openings. Cutting elements and pressure plates engage through said cutting openings and sever the wire guided and conveyed between the belts. During cutting, the wire is held between the two belts and is subsequently conveyed towards a disposal container. The belts, cutting elements and pressure plates are operated synchronously so that the cutting openings are synchronized with the action of the cutting elements and pressure plates.

16 Claims, 4 Drawing Figures

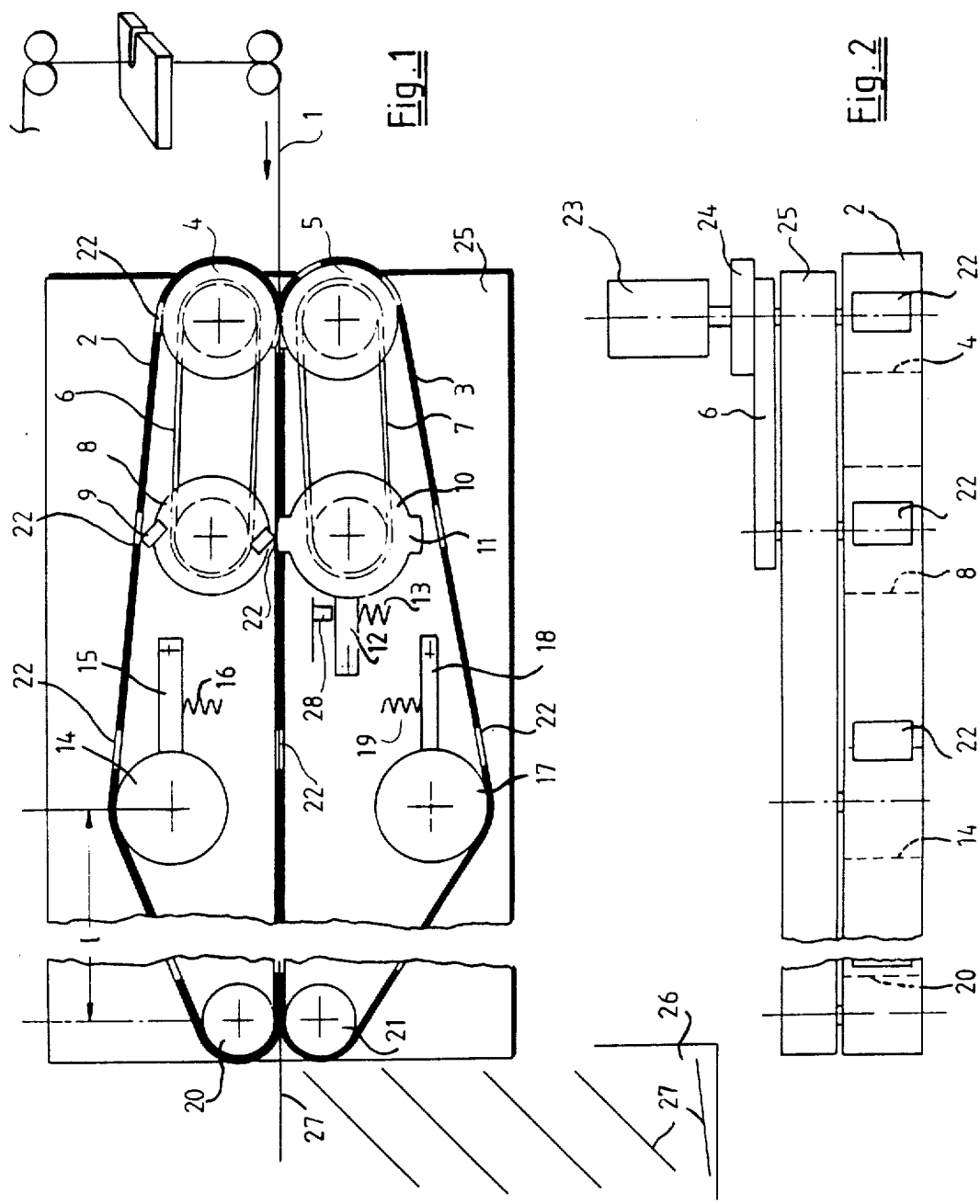

APPARATUS FOR SEVERING A STRIP-LIKE OR WIRE-LIKE ELECTRODE OF A SPARK EROSION MACHINE

BACKGROUND OF THE INVENTION

The invention generally relates to apparatus for severing the used electrode in spark erosion machining after the electrode has been removed from the erosion zone for disposal.

One such apparatus is known from DE-OS No. 27 55 740, wherein the electrode is fed to a cutting device by a pair of conveying rollers and the cutting device has a rotary, polygonal bit and a counter-tool in the form of an anvil. The separated pieces of wire fall directly from the cutting device through a disposal opening and out of the apparatus. A similar apparatus is known from JP-OS No. 56-89 441, in which the cutting device includes two solids of revolution, one having a radially aligned blade and the other being designed as a counter-tool with a smooth surface.

In the case of these conventional cutting apparatus, the severed pieces of wire fall directly out of the cutting device, so that the corresponding collecting container must be positioned directly at the cutting device. Because the spark erosion machine also takes up a certain area, the electrically live wire electrode must be led over a certain distance from the erosion zone to the disposal system. As the electrode is still live over the distance between the erosion zone and the disposal system, complicated and costly measures must be taken in the conventional apparatus for the guidance and insulation of the electrode. It is therefore desirable to keep the distance between the erosion zone and the disposal system as short as possible.

SUMMARY OF THE INVENTION

The problem addressed by the present invention is to construct a cutting apparatus so that it can be positioned directly following the erosion zone.

The basic principle of the invention is to cut the wire electrode immediately following the erosion zone and to convey the severed electrode pieces to a remote collecting container in the cut state.

For this purpose, the invention makes use of a belt conveyor, having closely spaced upper and lower belts through which the wire electrode is conveyed after leaving the erosion zone. The belts have formed therein cutting openings, through which a cutting device may operate. The electrode is cut near the beginning of the belt conveyor, between the belts, and is then conveyed in the cut state to a disposal container which can be spaced at a random distance from the cutting device.

The requisite synchronous movement between the two belts and the cutting device is achieved in one embodiment of the invention by a system of toothed belts and associated driving gears.

A very early cutting of the electrode may be obtained where the intake-side driving gears of the belt conveyor are also the gears of the cutting device carrying the cutting and counter-tool members.

According to another variant of the invention, the driving and cutting functions are separated and are synchronously driven by means of toothed belts.

The cutting device may be adapted to the advance speed of the wire electrode given by the spark erosion machine. A completely reliable synchronization of the apparatus may be obtained by coupling the driving gears of the belts directly through a gear system.

The cutting device in one embodiment includes a rotary cutting tool having circumferentially spaced cutting projections which act through the cutting openings of the belts.

To minimize the distance between the erosion zone and the disposal means, the invention is positioned directly following the erosion zone and further can also operate as a withdrawal device for withdrawing the electrode from the erosion zone of the spark erosion machine.

BRIEF DESCRIPTION OF THE DRAWINGS

The invention is described in greater detail hereinafter in accordance with illustrative embodiments and the attached drawings, which show:

FIG. 1, a diagrammatic side view of a first embodiment of an apparatus according to the invention.

FIG. 2, a plan view of the apparatus of FIG. 1.

DETAILED DESCRIPTION OF THE PREFERRED EMBODIMENTS

Figure 3:
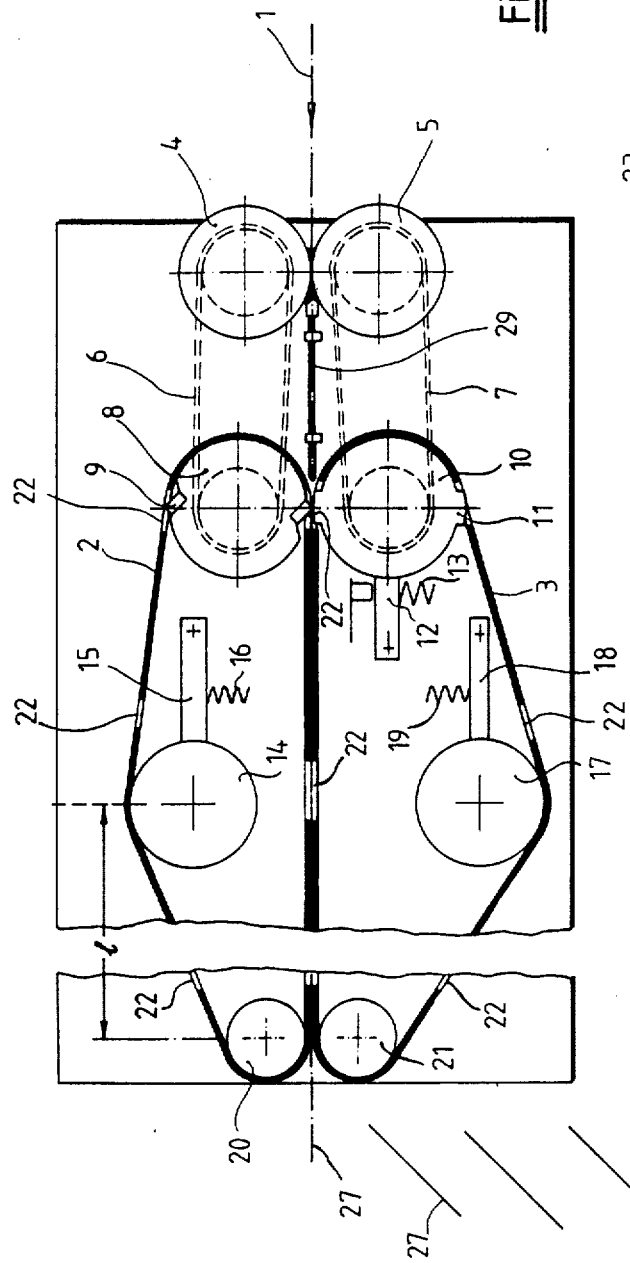
FIG. 3, a side view of a second embodiment of an apparatus according to the invention.

The same reference numerals in the individual drawings are used to designate the same or corresponding parts.

A belt-like or strip-like electrode 1 is conveyed away from the erosion zone of a spark erosion machine and is led to a belt conveyor, which comprises face-to-face endless belts 2, 3 which enclose the electrode 1 between them. Each belt 2, 3 is driven by a driving gear 4, 5, the gears being driven in synchronism with one another.

In the first embodiment shown in FIGS. 1 and 2, the driving gears 4, 5 drive, through toothed belts 6, 7, a gear cutter 8, which has circumferentially distributed cutting elements 9, and a pressure wheel or gear 10, which has corresponding pressure plates 11 distributed along its circumference. The gear cutter 8 and the pressure gear 10 together form the cutting device for severing the electrode. In the represented embodiment, the gear cutter has two cutting elements displaced by 180°, and the pressure gear 10 has two pressure plates 11 displaced by 180° and which are constructed as projections. The pressure gear 10 is pivotally mounted on a clamping arm 12 and is pressed by means of a spring 13 in the direction of gear cutter 8. A stop 28 limits the pivoting range of the pressure gear 10.

The two endless belts 2, 3 are pretensioned by means of tensioning pulleys 14, 17, which are pivotally mounted on clamping arms 15, 18. At the outlet side of the belt conveyor, belts 2, 3 are guided over guide pulleys 20, 21. From the inlet side (driving gears 4, 5) to the outlet side (guide pulleys 20, 21), the two belts 2, 3 run linearly parallel to one another, guiding electrode 1 between them and consequently conveying the same.

Each of the two belts 2, 3 includes several cutting openings 22 regularly spaced in the direction of belt travel. The two belts 2, 3 are so aligned with respect to one another that their cutting openings 22 are aligned in the area where the portions of belts 2, 3 are parallel to one another. In other words, the cutting openings 22 of belts 2, 3 face one another, so that in the vicinity of the cutting openings the wire guided between the belts is freely accessible from the top and bottom. The spacings of the cutting openings 22 exactly correspond to the circumferential spacing of the cutting elements 9 or the pressure plates 11 along the circumference of the gear cutter 8 or the pressure gear 10. The two belts 2, 3 are so timed with respect to the gear cutter 8 and pressure gear 10 that on moving the belts 2, 3 and the members 8, 10, the cutting elements 9 and plates 11 engage precisely in the cutting openings 22, so that the electrode is severed there. The length of cut corresponds to the spacing of adjacent cutting openings 22. After severing or cutting, the severed electrode portions 27 are further conveyed between the two belts 2, 3 until they finally drop into the disposal container 26 at the outlet side. The distance from the cutting device to the outlet side can be of a random length, so that the disposal container 26 can be set up at a random distance from the spark erosion machine. Following the severing of the electrode portions by the cutting device, the individual electrode portions 27 no longer have any electrical contact with one another, so that they are also no longer live.

As can be more particularly seen from FIG. 2, the individual gears and pivot arms are mounted on a frame 25. The two driving gears 4, 5 are also rigidly coupled together, for example by means of a gear system 24, which has a transmission ratio of 1:1. In the embodiment of FIGS. 1 and 2, there is provided an electric motor 23 for driving the driving gears 4, 5. However, it is also possible to drive the complete apparatus by means of a driving belt, e.g. a toothed belt, which is coupled to the strip or wire drive of the spark erosion machine.

In order to ensure a synchronous and phase-locked running between belts 2, 3, the belts are provided with an internal tooth system, whereas the driving gears 4, 5 have a corresponding external tooth system. In a similar manner, a synchronous, phase-locked drive of the cutting device is ensured by toothed belts 6, 7, which are engaged on corresponding tooth systems of gears 4, 8 and 5, 10 in a known manner.

Figure 4:
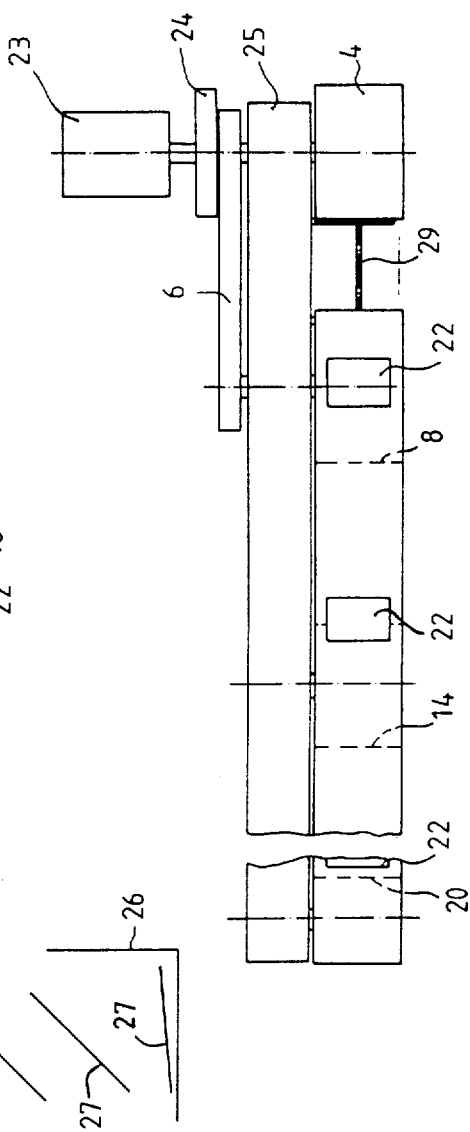
FIG. 4, a plan view of the apparatus of FIG. 3.

The embodiment of FIGS. 3 and 4 differs from that of FIGS. 1 and 2 essentially in that the gear cutter 8 and pressure gear 10 simultaneously serve as the driving gears for belts 2, 3, so that the distance from the inlet side for the belts to the cutting device is reduced to a minimum. In the embodiment of FIGS. 3 and 4 the driving gears 4, 5 are connected upstream of the belt conveyor (belts 2, 3) and serve as a pair of conveying rollers for the electrode 1, as well as driving means for the cutting device (gears 8, 10). For the precise guidance of the electrode along the path between the driving gears 4, 5 and the inlet side of the belt conveyor, it is possible to provide a guide tube 29, in whose interior is guided the electrode 1.

With the exception of the described differences, the embodiment of FIGS. 3 and 4 coincides with that of FIGS. 1 and 2.

It is naturally also possible in the case of the embodiment of FIGS. 3 and 4 to completely omit the two driving gears 4, 5 and to directly drive the two gears 8, 10 in the same way as for the driving gears 4, 5 in the embodiment of FIGS. 1 and 2.

FIGS. 1 and 3 clearly show that the pressure plates 11 of the pressure gear 10 are constructed as projections engaging with the cutting openings 22 of the lower belt 3. However, it is also possible to make these projections sufficiently high that they project over the median plane between the two belts 2, 3. This makes it possible to advance the electrode somewhat in the cutting zone and also, together with the spring preloading of pressure gear 10, to bring about an adequately high cutting force.

The apparatus according to the invention can directly follow the working or erosion zone of the spark erosion machine, so that the electrode is cut off a very short distance following the working zone. The disposal container 26 can be positioned at a random distance from the cutting means, corresponding to the chosen length 1 of the discharge or outlet side of the belt conveyor.

The belt conveyor or electrode conveying means of the apparatus according to the invention can simultaneously serve to withdraw the electrode from the working zone of the spark erosion machine, so that there is no need to provide a further withdrawal means, e.g., a pair of withdrawal rollers.

Details of the invention as described herein relative to the preferred embodiments can be utilized alone or in combination in accordance with the invention. Further improvements and modifications of the present invention are also possible and are intended to be encompassed within the true scope of the invention.

What is claimed is:

1. In a spark erosion machine using a continuously renewed strip-like or wire-like tool electrode to machine an electrically conductive workpiece in an erosion zone of the spark erosion machine, an apparatus for severing the electrode after the electrode has been removed from the erosion zone, comprising a conveyor means for receiving the electrode and substantially continuously transporting the electrode to a point of disposal and a cutting means for regularly servering the electrode so that the severed electrode portions are no longer electrically connected, wherein the conveyor means includes a pair of synchronized closely spaced, electrically nonconductive face to face belts between which is conveyed the electrode, each of the belts having formed therein a plurality of corresponding, regularly spaced cutting openings; the cutting means being positioned in an operative relationship with the belts near the point of receipt of the electrode by the conveyor means and synchronized with the movement of the belts so that the cutting means severs the electrode conveyed between the belts at a cutting opening therein; the severed electrode portions being conveyed thereafter by the conveyor means to the point of disposal.

2. The apparatus of claim 1 wherein the conveyor means includes a driving gear associated with at least one of the belts for driving the conveyor means, the driving gear having an external tooth system and the driven belt having an internal tooth system adapted to mate with the external tooth system of the driving gear.

3. The apparatus of claim 1 further comprising a means for synchronously driving the belts of the conveyor means and operating the cutting means.

4. The apparatus of claim 1 wherein the cutting means comprises at least one cutting element and at least one cooperating member against which the cutting element acts to perform the cutting action.

5. The apparatus of claim 3 wherein the spark erosion machine includes a system for transporting and guiding the strip-like or wire-like electrode to and through the erosion zone and the driving means is driven by the transport and guidance system of the spark erosion machine.

6. The apparatus of claim 2 wherein each belt of the conveyor means is driven by a driving gear and the driving gears are synchronized through a gear system.

7. The apparatus of claim 4 wherein the cutting element is rotatable and has on its perimeter at least one cutting blade, and the cooperating member is rotatable in synchronism with the cutting element and has on its perimeter at least one projection for engaging the cutting blade in a cutting opening of the belts.

8. The apparatus of claim 4 further comprising means for yieldingly biasing the cooperating member in the cutting position.

9. The apparatus of claim 1 wherein the apparatus is positioned directly following the erosion zone of the spark erosion machine and receives the electrode from the erosion zone.

10. The apparatus of claim 9 wherein the apparatus also acts as a withdrawal means for withdrawing the electrode from the erosion zone of the spark erosion machine.

11. In a spark erosion machine using a continuously renewed, elongated tool electrode to machine an electrically conductive workpiece in an erosion zone of the spark erosion machine, an apparatus for severing the tool electrode for disposal after the electrode has been removed from the erosion zone, comprising electrically nonconductive conveyor means for receiving the tool electrode and transporting the electrode along a predetermined transport path under substantially continuously engagement from the point of receipt to a point of disposal, and a cutting means positioned along the transport path near the point of receipt of the tool electrode by the conveyor means for servering the tool electode while the tool electrode is engaged and transported by the conveyor means so that the severed tool electrode portions are no longer electrically connected.

12. The apparatus of claim 11 wherein the conveyor means comprises a pair of closely spaced, face to face endless belts guided by a pulley system including at least one driven pulley, and an initial pair of cooperating pulleys forms the point of receipt of the conveyor means for the tool electrode.

13. The apparatus of claim 11 wherein the cutting means comprises a pair of synchronized rotating elements between which the tool electrode is conveyed, one element carrying at least one cutting blade and the other element carrying a like number of pressure surfaces that cooperate with the corresponding cutting blades to sever the tool electrode.

14. The apparatus of claim 13 wherein at least one of the rotating elements drives the conveyor means.

15. The apparatus of claim 12 further comprising a pair of cooperating rollers positioned upstream of the initial pair of pulleys for receiving the tool electrode and a guide tube positioned between the pair of rollers and the initial pair of pulleys for guiding the tool electrode therebetween.

16. The apparatus of claim 12 wherein the pulley system includes tensioning pulleys for pretensioning the endless belts.

* * * * *

UNITED STATES PATENT AND TRADEMARK OFFICE
CERTIFICATE OF CORRECTION

PATENT NO. : 4,709,130
DATED : November 24, 1987
INVENTOR(S) : Attilio Lodetti and Karl Tobler It is certified that error appears in the above-identified patent and that said Letters Patent is hereby corrected as shown below:

In Column 4, line 64, "ofthe" should be --of the--.

In Column 5, line 26, "continuously" should be --continuous--.

In Column 6, line 1, "servering" should be --severing-- and "electode" should be --electrode--.

Signed and Sealed this

Twenty-first Day of June, 1988

Attest:

DONALD J. QUIGG

Attesting Officer

Commissioner of Patents and Trademarks